May 14, 1968  W. GLAMANN  3,382,855
TORQUE CONVERTERS AND POWER PLANTS
Filed Sept. 16, 1965  2 Sheets-Sheet 1

Inventor
WILHELM GLAMANN
By Tweedale & Gerhardt
Attorneys

May 14, 1968     W. GLAMANN     3,382,855
TORQUE CONVERTERS AND POWER PLANTS
Filed Sept. 16, 1965     2 Sheets-Sheet 2

Inventor
WILHELM GLAMANN
By Tweedale & Gerhardt
Attorneys

United States Patent Office 3,382,855
Patented May 14, 1968

3,382,855
TORQUE CONVERTERS AND POWER PLANTS
Wilhelm Glamann, 5a Lehmbacher Weg,
Forsbach, Bezirk, Cologne, Germany
Filed Sept. 16, 1965, Ser. No. 487,707
6 Claims. (Cl. 123—119)

This invention relates to a hydrodynamic fluid converter and to a supercharged combustion engine power plant including such a converter.

According to the present invention I provide a power plant comprising in combination a supercharged combustion engine with a Föttinger fluid torque converter, the latter including impeller, turbine and reaction members, a main driving shaft from the engine connected to an impeller member of the converter, a main driven shaft connected to a first turbine member of the converter and driving the load of the power plant, an auxiliary driven shaft connected to a second independent turbine member of the converter and driving the supercharger of the combustion engine.

Further according to the present invention I provide a power plant comprising in combination a supercharged combustion engine with a hydrodynamic or Föttinger fluid torque converter, the latter including impeller members, turbine members and reaction members, a main driving shaft from the engine connected to an impeller member of the Föttinger converter, a main driven shaft connected to a first turbine member of the Föttinger converter and driving the load of the power plant, an auxiliary driven shaft connected to a reaction member of the Föttinger converter, said reaction member being rotatable in the reverse direction to the impeller member and serving as a second independent turbine member simultaneously to its service as a reaction member, the said auxiliary driven shaft driving a supercharger of the combustion engine.

Still further according to the present invention I provide a power plant comprising in combination, a combustion engine supercharged by an exhaust gas turbo blower and a mechanically driven displacement blower, a Föttinger fluid torque converter including impeller, turbine, and reaction members, a main driving shaft from the engine connected to an impeller member to the Föttinger converter, a main driven shaft driving the load of the power plant and connected to a first turbine member of the converter, an auxiliary driven shaft driving the displacement blower of the engine and connected to a second independent turbine member of the converter.

Still further according to the present invention I provide a power plant comprising in combination, a supercharged combustion engine, a Föttinger fluid torque converter including impeller, turbine and reaction members, a differential gear, a main driving shaft from the engine connected to an input member of the differential gear, an intermediate driving shaft from one output member of the differential gear connected to an impeller member of the converter, a main driven shaft connected to a first turbine member of the converter and driving the load of the power plant, an auxiliary driven shaft drivingly connected to a supercharger of the engine and connected also to a secondary independent turbine member of the converter and to the other output member of the differential gear.

The so-called Trilok principle is already known for the purpose of obtaining uni-directional rotation of the reaction member or members in Föttinger converters. Such a reaction member is arranged to be stationary in a casing and to transmit the reactive moment to the latter, so long as the converter is acting as a converter. The reaction member is however connected by a free-wheel gear with the casing and is consequently released from the latter to rotate in the sense of a pump and a turbine when not influenced by a reactive moment.

In the present invention, in the known technics of a differential supercharger drive for diesel engines, the known mechanical distributing gear is replaced by a hydraulic distributor acting in dual function simultaneously as a hydraulic converter for transforming the engine torque.

For the fullest possible utilisation of the resulting engine charateristics, the invention further purposes as a useful supercharging arrangement a displacement blower with adiabatic internal compression according to now known technics which is preferentially made the second stage of a two-stage supercharging system the first stage of which consists of an exhaust-gas turbo-blower.

An embodiment of the invention will now be described by way of example, with reference to the accompanying drawings, in which.

Figure 1:
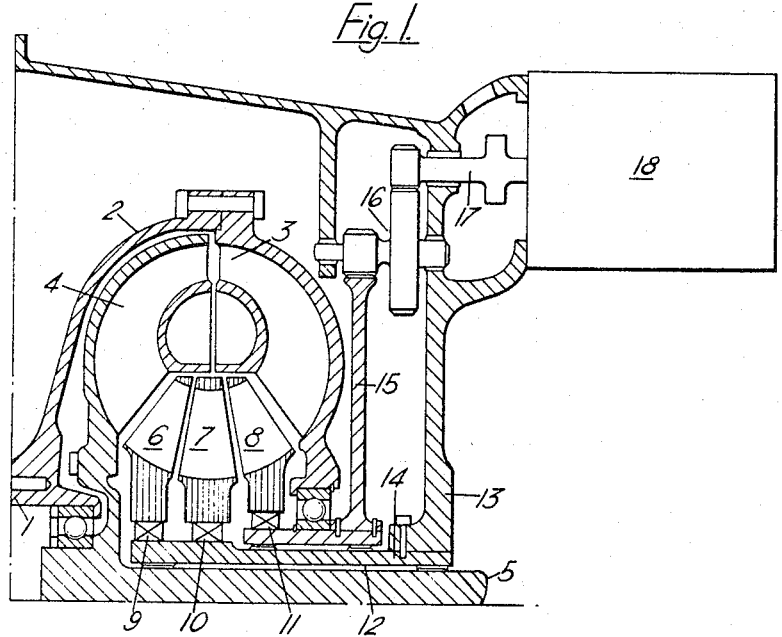
FIG. 1 shows a torque-converter according to the present invention with three reaction members (stator rings) of which each can freewheel but only two are mounted on the casing, whereas the third is adapted to transmit its reactive turbine torque to a freely-rotatable, secondary or auxiliary drive connected to the supercharger of the combustion engine.

In FIG. 1, a torque converter is provided with an engine-end driving flange 1 to which is attached the crankshaft flange of a diesel engine either directly or through a spur or epicyclic gear. In the directly-coupled embodiment, a primary rotor, consisting of torque converter casing 2 and impeller 3, acts in known manner as the engine flywheel mass.

A secondary rotor or main turbine wheel 4 is, as usual, fixed to the secondary or main driving shaft 5.

It is known to provide one or two reaction members (stator rings), and in the embodiment shown, three reaction members 6, 7 and 8 are provided. The members 6 and 7 are held by freewheel members 9 and 10 on the fixed tube 12, which is attached to the casing 13.

The reaction member 8 acts also as an auxiliary independent turbine member. It is held by a freewheel member 11 on a rotatable tube 14 which is coupled with a gear wheel 15, which transmits the received, reactive torque of the reaction member 8 through a gear 16 to a secondary (auxiliary) take-off shaft 17 which drives a compressor 18, for example, a displacement blower. The blower 18 is flanged to the casing 13 forming an integral, self-contained unit, which can be produced and supplied as such and fitted to existing engines in place of the usual clutch and flywheel or instead of a usual gearbox.

Figure 2:
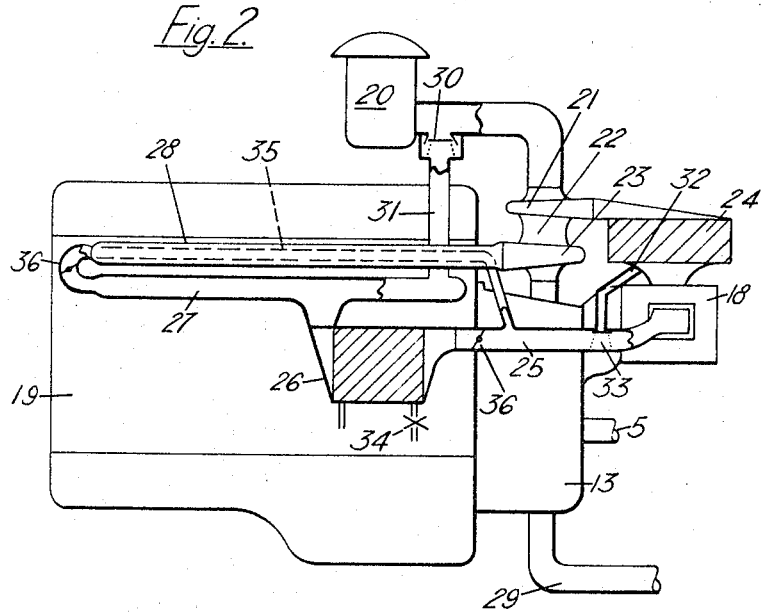
FIG. 2 shows the installation of the converter of FIG. 1 in a supercharged diesel engine.

FIG. 2 shows the combination of the above described torque converter with an engine.

The engine 19 carries at its driving end the torque-converter casing 13 from which the power take-off stub shaft 5 projects. In the embodiment, the engine crankshaft, not shown, directly drives the primary rotor 2.

As in FIG. 1, the compressor 18 is flanged to the converter casing. Above the converter casing is located an upright exhaust-gas turbo-blower 22 with blower casing 21 and turbine casing 23.

The engine receives its combustion air through an air-intake filter 20. The radial blower 21 forces this air through an inter-cooler 24 into the displacement blower 18. From the last-named, the air flows through a pipe 25 through a final cooler 26. From there, the air passes into the engine intake manifold 27.

The engine spent gases exhaust through a manifold 28 supercharging blower. The exhaust gas leaves the turbine 23 through the exhaust pipe 29.

Figure 3:
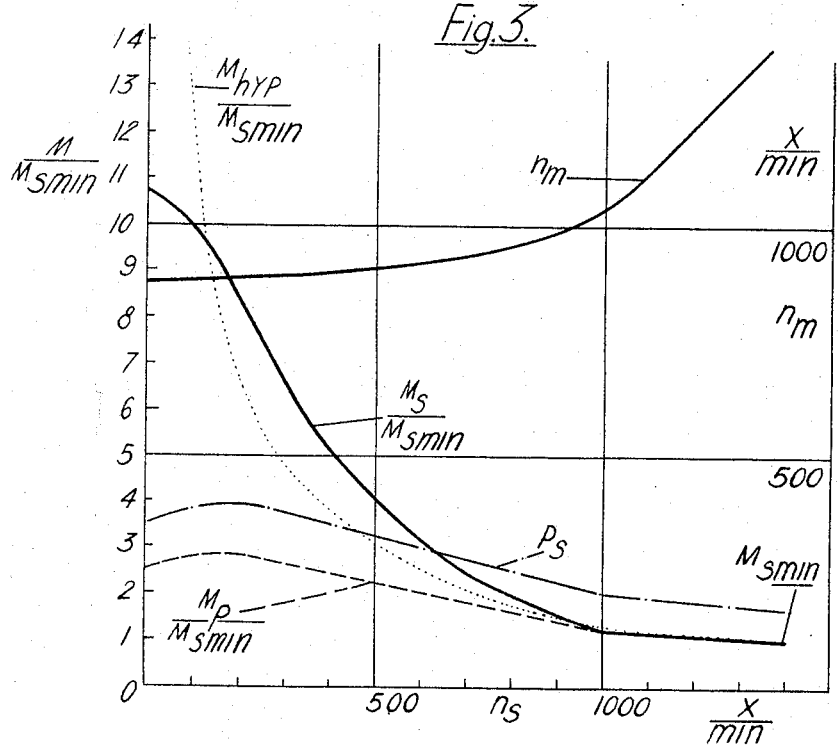
FIG. 3 is a graph showing the principal characteristic curves of the power palnt shown in FIG. 2.

FIG. 3 shows characteristic curves of the power plant according to FIG. 2. The running speed (r.p.m.) of the secondary shaft 5 is plotted on the scale of the abscissae in arbitrary units, x/min. The left-hand ordinate is the scale for moment (torque) values. The values at the bottom of this scale also represent, in arbitrary units, e.g. kg./cm.$^2$, the supercharging pressure $p_s$ in the engine intake manifold 27.

The right-hand ordinate carries the scale of r.p.m. in arbitrary units x/min. representing the engine speed, $n_m$.

In addition to curves of engine speed (curve $n_m$) and engine supercharging pressure (curve $p_s$), FIG. 3 shows three torque curves. Each of these represents a torque ratio, viz., referred to the smallest secondary torque, $M_{s\ min.}$, obtained with the highest, secondary running speed. The following torque values are represented by the curves:

The secondary torque $M_s$, as the quotient $M_s/M_{s\ min.}$;

The ideal secondary torque hyperbolic torque curve, $M_{hyp.}$, as the quotient $M_{hyp.}/M_{s\ min.}$;

The primary engine torque $M_p$ as the quotient $M_p/M_{s\ min.}$.

Figure 4:
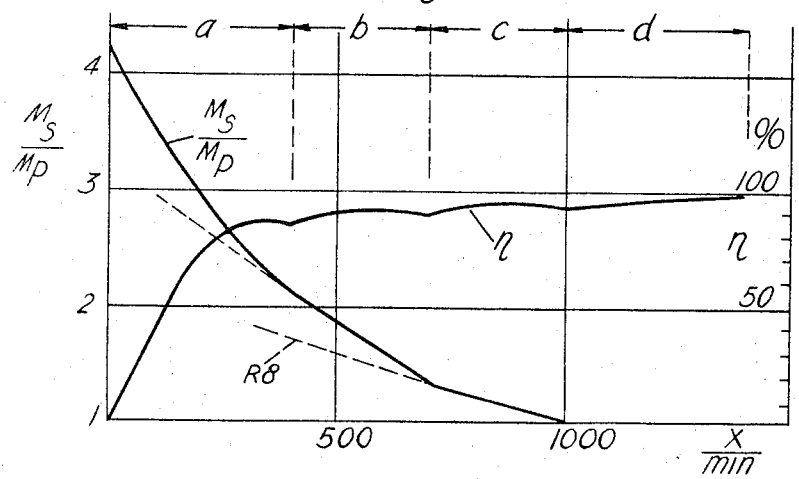
FIG. 4 is a graph showing the characteristic curves of the torque-converter of the invention.

FIG. 4 shows other characteristic curves of the fluid converter, plotted in known manner. The axis of the abscissae again carries the scale of the secondary r.p.m. speed, in arbitrary units x/min. The curve $M_s/M_p$ represents the ratio of secondary to primary (torque) moments (left hand ordinate scale). The "eta" curve shows the development of the hydrodynamic efficiency (right hand ordinate scale). In both curves, and in the curve $M_s/M_{s\ min.}$ of FIG. 3, four divisions can be recognised: a, b, c and d; which in the case of FIG. 4 however, merge into fair curves. These divisions correspond to the following states:

(a) Stators 6 and 7 locked by casing 13; turbine 8 driving blower.

(b) Reactor 6 loose, freewheeling; stator 7 locked; turbine 8 driving blower.

(c) Reactors 6 and 7 loose, freewheeling; turbine 8 driving blower.

(d) Three reactors loose, freewheeling.

The reversely-acting (reactive) torque of the turbine 8 driving the blower 18 is represented by the broken line R8 (in FIG. 4); in such configuration, on the left-hand ordinate scale (on FIG. 4), the figures represent not ratios, but actual moments, in arbitrary units. The line R8 continues beyond the plotted range to the left in approximately the same direction. The full curve has not been plotted, since it depends greatly on the design form of the member 8. To the right, the line R8 coincides with the full line $M_s/M_p$.

The manner of action of the power plant is as follows:

When the engine is running under no load (idling), the shaft 5 and the members 6, 7, 8 are at rest, since there is practically no forward moment acting on the turbine 4 and hardly any reactive moment on the turbine member 8. The engine draws the combustion air through a non-return valve 30 by means of a bypass pipe 31.

When the throttle is opened a forward torque is exerted on the turbine 4 and reactive moments on the members 6, 7, 8. The members 6 and 7 are at first locked against the casing 13, while the turbine 8 begins to drive the blower 18. The engine thus becomes supercharged and the non-return valve 30 closes. As long as the quantity of exhaust gas is insufficient to drive the exhaust-gas turbine 23, the blower 18 merely draws air through the radial blower 21. At full throttle, with the shaft 5 at rest, the peak values of the curves $M_s/M_{s\ min.}$ (FIG. 3) and $M_s/M_p$ (FIG. 4) are attained.

The power transmitted through the auxiliary turbine 8 is provided by the fact that the engine rotates somewhat faster than it would with the member 8 at rest and the same ratio $M_s/M_p$.

For the sake of conformity, it is assumed that the vehicle, or the machinery driven by the power unit requires for starting a torque ratio as represented above, that is, of about eleven times the total moment $M_{s\ min.}$. In this regard, the total moment $M_{s\ min.}$ represents the driving torque of a suitably supercharged diesel engine, e.g. with an m.e.p. of about 140 p.s.i. The starting torque on the secondary shaft 5 is thus very high.

In the starting condition, the blower 18 supplies high pressure air and the exhaust-gas turbine 22, receiving an ample supply of exhaust gas, rotates nearly at maximum speed. The delivery of both blowers with high delivery pressure representing for each blower a relatively moderate pressure ratio of slightly more than 2:1.

The charging air temperature is kept low by the coolers 24 and 26.

As the output shaft accelerates, the output torque falls slowly, approximately following the curve $M_s/M_{min.}$ and the engine charging pressure follows the curve of $P_s$. The fuel charge per engine working cycle may be in all running conditions, in known manner, controlled by the charging pressure $P_s$, which control can be effected by any commercially-available plunger or membrane governor on the injection-pump control spindle.

The torque available for driving the compressor 18 is approximately proportional to the engine torque $M_p$ and falls according to the curve R8 with increasing speed of the output shaft 5. It falls to zero when at the beginning of working phase "d," the turbine reaction member 8 begins to freewheel. "Turbine reaction member" is to be understood as equivalent to "simultaneously reaction member and turbine." From the beginning of phase "d" onwards, the compressor 18 is no longer driven by the engine. It can thereafter be driven by the delivery pressure of the radial blower 21 (so that the turbine reaction member of the converter would be transformed into an impeller member, provided that it does not freewheel in opposite direction) or as a displacement turbine run idle; but can also be bridged by a bypass pipe 32 with non-return valve 33 (FIG. 2).

If an exhaust-gas turbine is not provided, the engine draws its air during working phase "d," through the valve 30.

The engine works in phase "d" as an ordinary, turbo-supercharged engine. With full speed on the output shaft 5, an output torque $M_{s\ min.}$ which in the example corresponds to an absolute charging pressure of 1.7 kg./cm.$^2$, is obtained. It is assumed that at the starting point of operating phase "d" at $n_s=1000$ x/min.), the charging pressure will have risen by about 20% which can easily be achieved with an ordinary, exhaust-gas turbo-supercharger.

In the three operating phases a, b and c, the turbine wheel or auxiliary turbine 8 runs relatively slowly backwards, and as the transmission ratio to the compressor 18 is high, the speed of rotation of blower 18 is high. This slow, backwards motion enables a good, low-loss design of the reaction member 8: both when acting as a reaction member and, simultaneously, as a turbine rotor.

At low, partial loads, the engine receives even more air than it requires for good combustion; as is the case, for any standard diesel engine. This superfluous air feed can, however, in the power plant according to the example, be appropriately reduced, with the result that very suitable partial-load efficiencies can be obtained. In order to attain this, the cooling effect of the intercooler 26 (and cooler) can be controlled by a control cock 34, depending on the engine load, in such manner that, with decreasing load, the degree of inter-cooling is progressively reduced, and, from a particular part-load, e.g., ¾ load, onwards, no intercooling takes place at all. The control cock 34 can for instance be controlled in known manner, by the setting of the control spindle of the (fuel) injection pump. The final cooling stage, can, however, also in known manner, be automatically governed, by adjusting the fan used for this cooling stage.

In addition, the example provides that with further falling partial load, i.e., from ¾ load downwards, the charging air is powerfully reheated: e.g., by a bypass pipe 35, located in the axis of the exhaust pipe 28, and completely surrounded by the exhaust gases; the inflow and outflow of air is load-controlled in essentially known manner by throttles or slide-valves 36. By this means, a very low part-load fuel consumption can be achieved, since the compressor 18 runs slower than when the cold air entering thereinto is cooled to a greater extent. The fuel consumption curve of the power plant becomes, by this means, exceedingly flat.

This feature could be embodied in power plants of any ordinary kind and it is immaterial or nearly so whether the charging air is heated or not. Usually, in fact, it would be harmful.

Instead of the particular reaction member or guide ring 8, it is of course possible to use as a turbine member another of the reaction members (e.g., 6 or 7) or a number of reaction members (e.g., 6 and 8) or all together (6, 7 and 8) arranged to be rotatable in the reactive direction. Several reactively rotating members can be combined with the same, secondary output compressor drive, or with different drives. All combinations of this or any other kind of auxiliary turbine member are possible, and it is intended that these alternatives be covered by the appended claims, in so far as a supercharger of the engine is driven by such auxiliary turbine member.

As an example, the engine oil-pump and the fan or fans for intercooling can be coupled to different, secondary turbine drive members of the (torque-) converter; which may be particularly advisable, since these equipments can then be desirably made load-dependent in a suitable manner.

From the point of view of hydraulic and structural design, an arrangement can be realized in which the freewheeling reaction member 6 can simultaneously act as an auxiilary turbine, while 7 and 8 are fixed, free-wheeling reactors. The gear train 15, 16 can then be fitted behind the open casing 13, in a closed gearbox.

A simple form of embodiment of the invention, suitable for small and cheap engines, is obtained if only one reaction member, e.g., 6 in FIG. 1 is provided. This form of embodiment can be marketed in combination with a cheap, mass-produced, exhaust turbo-blower, since the efficiency of the turbo-blower does not play a part, if the turbo-blower is backed by a compressor 18. Between full and about half the take-off driving speed, such a power-unit can behave as any ordinary, hitherto usual engine, the compressor 18 idling, bridged by the valve 30, if no turbo-blower 23 is provided, or by the valve 33, if such a blower is fitted. From half-speed on the power take-off to stop, the ever-increasing supercharge by blower 18 produces a very steep torque curve; the torque value when stopped rising to about 15 times the torque at cut off of the blower 18.

The advantages of the embodiments compared with what has hitherto been known will now be described.

Compared with a mechanical, differential blower drive, the embodiments have the advantage that a mechanical, differential gear is entirely eliminated. Furthermore, the driving torque on the compressor 18 does not, as in the case of a mechanically driven, differential blower, vary proportionally with the engine driving torque, but is superimposed on the curve R8, which automatically drops to zero, so that the full, output r.p.m. are attained; in the case of a mechanical, differential gear, the compressor must be stopped to obtain full speed on the power take-off.

Also, the ideal hyperbolic curve $M_{hyp.}/M_{s\ min.}$ in FIG. 3 has always hitherto been regarded as the unattainable ideal of a power-transmission curve and has not yet been attained, despite excessive endeavours in known power plants. This curve is considerably exceeded by the curve of $M_s/M_{min.}$ as shown in FIG. 3. To achieve this, only a brief, great effort of the engine at starting is required, corresponding to the natural requirements to overcome any mass having substantial inertia. The torque is easily attained since ample excess air is available at starting and, as a result, overheating and smoking of the engine are removed.

A further drawback in existing power plants with transmission by a Föttinger converter has been that the peak starting torque corresponds to only a single point on a steeply-rising torque curve; i.e., does not in practice represent any particular state of motion. A starting torsue ratio of, for instance, 6:1 in the case of power plants with Föttinger converters as hitherto built, does not in practice present more than a substantially smaller, actual starting torque ratio. In the case of the power plant described, not only is a far higher, absolute value of the conversion ratio attained, but in addition a "full" torque curve, merging smoothly into the ordinate is obtained.

Known devices in relation to braking, behaviour at high altitudes, an emergency transmission connected in series, declutching, combining the auxiliaries in a single gear block, the arrangement in the chassis or undercarriage, arrangements on the engine, etc., may be used in combination with the described power plant.

Additional devices usually associated with Föttinger converters, such as a mechanical progressive gear-shift, can be used with the described converter as with ordinary converters.

Modifications may be made, for example the torque converter need not be constructed on the Trilok or Schneider principle, but may be of any other type: e.g., a Lysholm converter.

In a further modification, the arrangement according to the invention is applied to the rear-axle differential gear of a vehicle, when all duties, including those mentioned in the present context, can be performed by a single, hydraulic power unit.

In the case of large power installations, a combination of a known mechanical, differential blower-drive according to the present inventor's earlier proposals in combination with a hydraulic differential blower-drive as described, could be used.

In particular, the known arrangement can be combined with the present embodiment employing either two, mechanically-driven displacement blowers in parallel or in series, or only one blower. This blower is in such case, driven firstly, as stated in the above-mentioned earlier proposals, by a mechanical input differential gear acting simultaneously as a transmission gear for the converter; and additionally, by a hydraulic differential gear as described above, as soon as the auxiliary drive (17 in FIG. 1) comes into action. The freewheeling arrangement 11 ensures that the two gear drives act independently of each other, so that they can be directly coupled together, e.g., by spur wheels.

This combination provides an exceedingly economical and structurally simple solution, of interest for large power installations (e.g., locomotives). It has the advantage that the power to be taken off the auxiliary drive 17 is relatively small, and only rises perceptibly during starting and running-up, so that in the economically-important operating stage, the auxiliary turbine works as if the wheel were stationary. For shunting locomotives required to run economically, this is of quite exceptional interest.

I claim:

1. A power plant comprising in combination a supercharged combustion engine with a Föttinger fluid torque converter, the latter including impeller, turbine and reaction members, a main driving shaft from the engine connected to an impeller member of the converter, a main driven shaft connected to a first turbine member of the converter and driving the load of the power plant, an auxiliary driven shaft connected to a second independent turbine member of the converter and driving the supercharger of the combustion engine.

2. A power plant comprising in combination a supercharged combustion engine with a Föttinger fluid torque converter, the latter including impeller members, turbine members and reaction members, a main driving shaft from the engine connected to an impeller member of the Föttinger converter, a main driven shaft connected to a first turbine member of the Föttinger converter and driving the load of the power plant, an auxiliary driven shaft connected to a reaction member of the Föttinger converter, said reaction member being rotatable in the reverse direction to the impeller member and serving as a second independent turbine member simultaneously to its service as a reaction member, the said auxiliary driven shaft driving a supercharger of the combustion engine.

3. A power plant comprising in combination, a combustion engine supercharged by an exhaust gas turbo blower and a mechanically driven displacement blower, a Föttinger fluid torque converter including impeller, turbine, and reaction members, a main driving shaft from the engine connected to an impeller member of the Föttinger converter, a main driven shaft driving the load of the power plant and connected to a first turbine member of the converter, an auxiliary driven shaft driving the displacement blower of the engine and connected to a second independent turbine member of the converter.

4. A power plant as claimed in claim 3, in which there is provided a by-pass pipe arranged to enable air to by-pass the displacement blower, a non-return valve adapted to control flow of air through said by-pass pipe, a further by-pass pipe arranged to enable air to by-pass the blowers, and a further non-return valve adapted to control flow of air through said further by-pass valve.

5. A power plant as claimed in claim 1, including a by-pass loop for intake air and situated axially within the engine exhaust gas manifold, and throttle valves adapted to control flow of intake air through said by-pass loop so that the engine intake air may be controllably heated in accordance with its unexploited load-capacity.

6. A power plant comprising in combination, a supercharged combustion engine, a Föttinger fluid torque converter including impeller, turbine and reaction members, a differential gear, main driving shaft from the engine connected to an input member of the differential gear, an intermediate driving shaft from one output member of the differential gear connected to an impeller member of the converter, a main driven shaft connected to a first turbine member of the converter and driving the load of the power plant, an auxiliary driven shaft drivingly connected to a supercharger of the engine and connected also to a secondary independent turbine member of the converter and to the other output member of the differential gear.

No references cited.

CARLTON R. CROYLE, *Primary Examiner.*

D. HART, *Assistant Examiner.*